Figure 2:
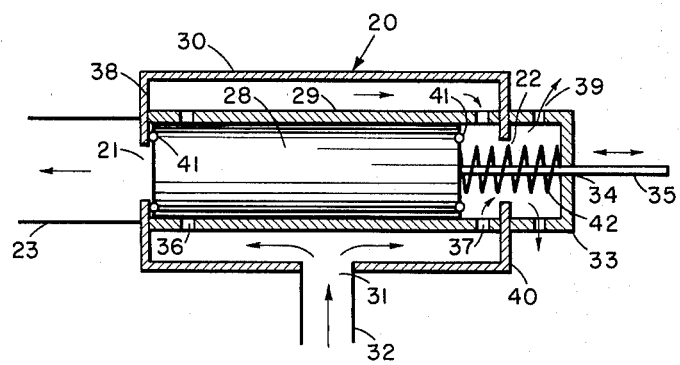

Aug. 17, 1965    R. G. BARTLETT, JR    3,200,816
OXYGEN SUPPLY SYSTEM
Filed June 12, 1962    3 Sheets-Sheet 1
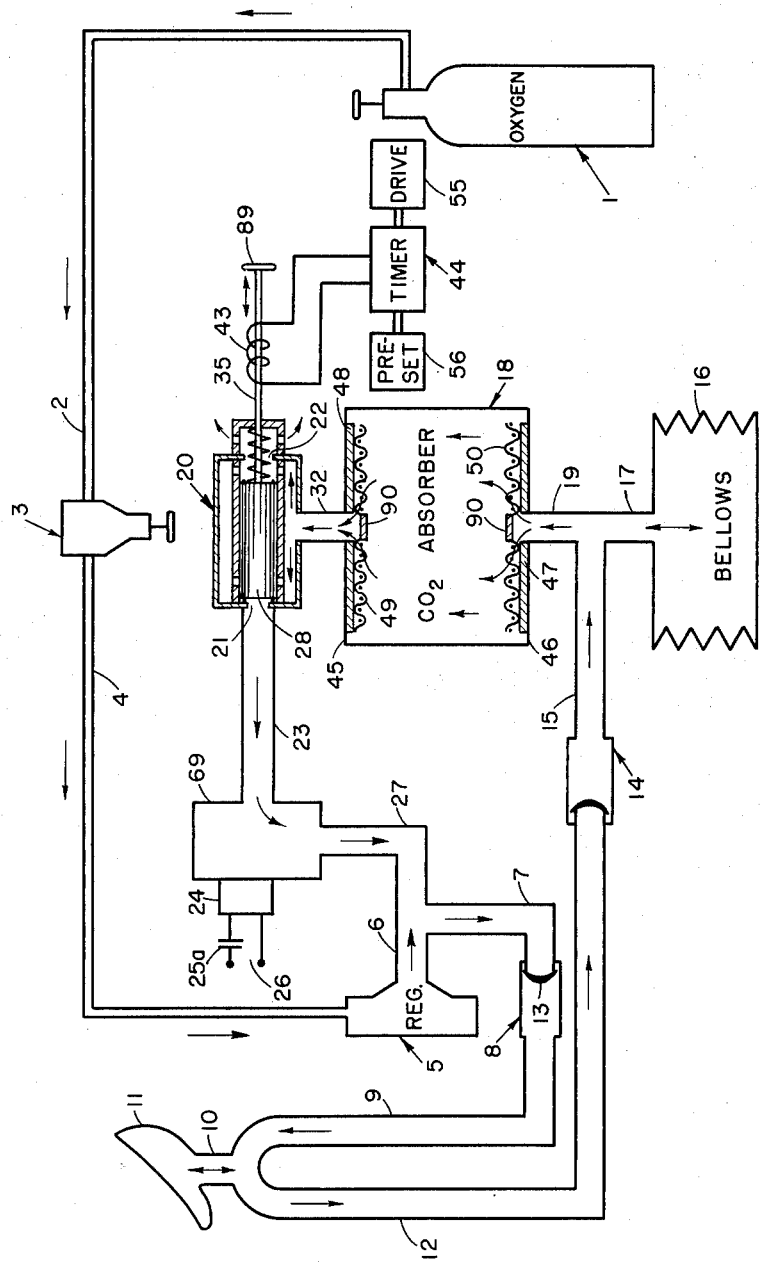
Fig. 1
INVENTOR.
Roscoe G. Bartlett, Jr.
BY 
Attorney Aug. 17, 1965   R. G. BARTLETT, JR   3,200,816
OXYGEN SUPPLY SYSTEM
Filed June 12, 1962   3 Sheets-Sheet 2

INVENTOR.
Roscoe G. Bartlett, Jr.
BY
Attorney

INVENTOR.
Roscoe G. Bartlett, Jr.
Attorney

United States Patent Office 3,200,816
Patented Aug. 17, 1965

3,200,816
OXYGEN SUPPLY SYSTEM
Roscoe G. Bartlett, Jr., U.S. Naval School of Aviation, Pensacola, Fla.
Filed June 12, 1962, Ser. No. 202,028
11 Claims. (Cl. 128—142)
(Granted under Title 35, U.S. Code (1952), sec. 266)

The invention described herein may be manufactured and used by or for the Government of the United States of America for governmental purposes without the payment of any royalties thereon or therefor.

The present invention relates generally to respiratory apparatus for sustaining individuals exposed for relatively long periods of time to environments having an inadequate oxygen content and, more particularly, to an oxygen rebreathing system for aircraft and manned space vehicles which contains an automatic nitrogen elimination feature which operates with a minimum drain on the oxygen supply.

With the advent of high performance aircraft and manned space vehicles, the need has arisen for compact, lightweight oxygen supply systems capable of sustaining individuals for extended periods of time. Because of space and weight restrictions, these systems cannot be of the so-called "open circuit type" wherein oxygen once inhaled by the individual is discharged out of the system. The closed circuit or rebreather system with its reclamation feature makes more efficient use of the oxygen and, consequently, is much more suited to applications of the type mentioned above. However, the advantages inherent in these systems are somewhat offset because of the rather considerable amount of oxygen which must be expended initially to eliminate the nitrogen normally present in the respiratory systems of individuals who have not been preoxygenated. Moreover, after this initial flushing, nitrogen must be eliminated periodically from the lungs and body, and this additional oxygen drain in the past has meant that the oxygen storage containers in closed systems had to be of a size comparable to those needed in open circuit systems.

Although there are rebreathing systems available in the prior art which contain some provision for nitrogen elimination, the flushing periods in most of these systems do not take place automatically but must be initiated by the individual on a voluntary basis. Moreover, the timing and duration of these periods depend upon the individual's judgment unaided by any monitoring device. Consequently, while the procedures adopted ultimately result in nitrogen elimination, they are usually inadequate in the early denitrogenation period when nitrogen is rapidly being evolved from the body and excessive and wasteful of oxygen thereafter when this rate diminishes.

It is accordingly a primary object of the present invention to provide a rebreathing type of oxygen system which contains an economic nitrogen elimination feature.

A still further object of the present invention is to provide a compact and lightweight oxygen system for sustaining personnel over relatively long periods of time wherein the nitrogen accumulated in their respiratory systems is automatically eliminated with minimum drain on the oxygen supply.

A still further object of the present invention is to provide an oxygen storage system which operates in either an open or closed circuit mode in accordance with the respiratory needs of the individual being sustained by the system.

A yet still further object of the present invention is to provide an oxygen rebreathing system wherein the individual draws his inspired breath from a constantly moving air stream and expires into this air stream.

A yet still further object of the present invention is to provide a rebreathing system having a resistance-free breathing characteristic.

A yet still further object of the present invention is to provide a rebreathing oxygen system for use in aircraft and the like which automatically switches over to an open-circuit mode in emergencies.

Figure 3:
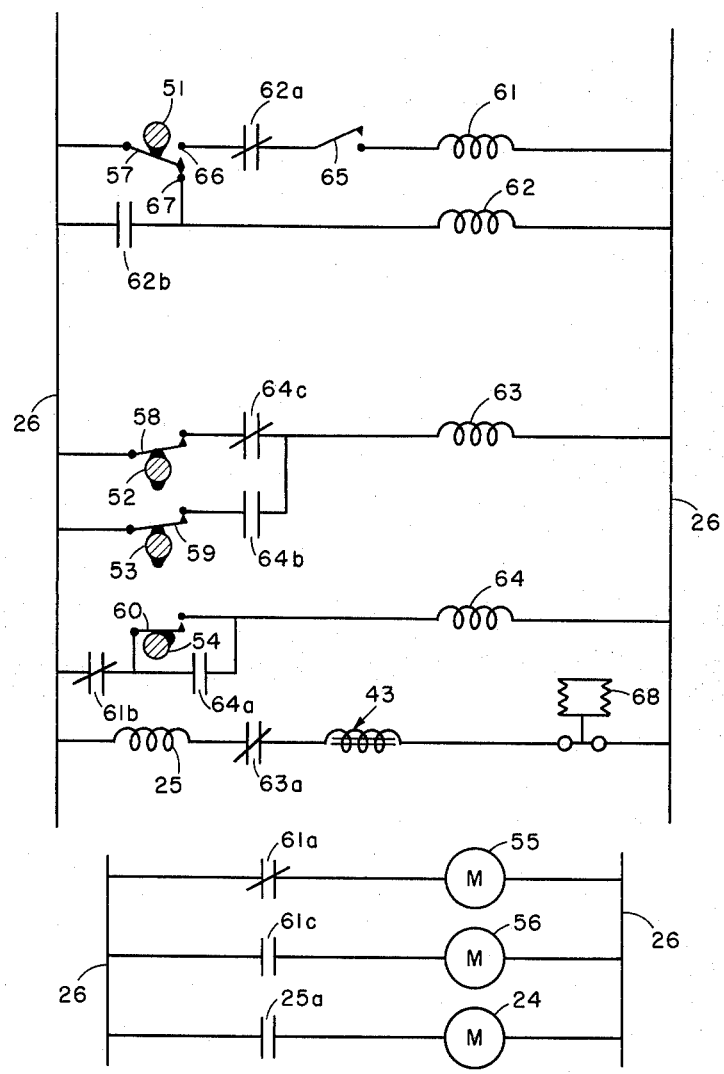

Other objects and many of the attendant advantages of this invention will be readily appreciated as the same becomes better understood by reference to the following detailed description when considered in connection with the accompanying drawings wherein:

FIG. 1 schematically illustrates one embodiment of the present invention;

FIG. 2 diagrammatically depicts the construction of the two-way air valve used in the system of FIG. 1;

FIG. 3 is an across-the-line diagram of the timing circuit of FIG. 1; and

Figure 4:
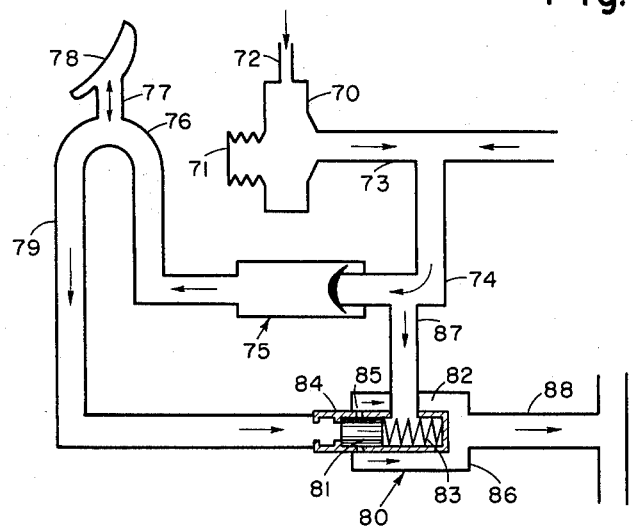

FIG. 4 diagrammatically illustrates a modification to the system of FIG. 1 which adapts it to pressure breathing.

Briefly and in somewhat general terms, the above objects of invention are realized, according to one preferred embodiment of the present invention, by combining a demand type, open system and a rebreather or closed system in a hybrid configuration and automatically switching from one of these modes to the other in accordance with a preset program which is designed to conserve oxygen yet satisfy the normal respiratory demands of the user. The switching schedule is such that the individual first breathes pure oxygen during a starting period to flush out any nitrogen in his system, his exhalations at this time being discharged out of the system. Thereafter, the system switches to a closed circuit mode to conserve oxygen and, during this rebreathing interval, nitrogen is allowed to accumulate in his respiratory system but not to an unsafe level. This nitrogen, together with any present in the apparatus, is next flushed out by a second period of open circuit breathing. Thereafter, the system returns to a closed mode of operation, and this is followed by a third period of open circuit breathing, and so forth. This sequence is continued throughout the flight but, after a predetermined number of cycles, the periods of open circuit breathing are shortened to further conserve oxygen by taking advantage of the lower rate of nitrogen accumulation.

While the automatic nitrogen elimination feature of the present invention does bring about a considerable saving of oxygen, it does, nevertheless, present a possible safety hazard for, if a loss of cabin pressure occurs near the end of the first closed circuit period when the rebreathing mode may have permitted the nitrogen accumulation to have risen to, perhaps, fourteen or eighteen percent, hypoxia may be produced. To safeguard against this, a pressure-sensitive switch is incorporated into the control system for automatically transferring the system to the open circuit mode in the event of a sudden pressure drop. Additionally, the system contains a fail-safe provision whereby the system immediately switches to an open circuit condition when any power failure occurs.

Referring now to FIG. 1 of the drawings, which diagrammatically illustrates an oxygen supply system embodying the present invention, oxygen stored under pressure in container 1 is coupled via line 2 to the high pressure side of a pressure reducer 3. The low pressure side of this reducer is coupled via line 4 to a demand valve 5 of conventional design, and the output from this valve is coupled via lines 6, 7, check valve 8 and line 9 to a breathing passageway 10 formed in the lower portion of a face mask 11. It will be appreciated that storage container 1, pressure reducer 3, demand valve 5 and face mask 11, together with the lines interconnecting them, from the inspiratory portion of a demand type of oxygen supply system wherein the respiratory requirements of the individual wearing the face mask are automatically satisfied by fresh oxygen flowing into the mask at a rate determined by the individual's needs. More particularly, demand valve 5 is adapted to open low pressure oxygen line 4 to line 7 whenever a negative pressure is developed at its control side in response to either a single deep inhalation or repeated, normal inhalation efforts.

In the expiratory portion of each breathing cycle, air discharged from the individual's respiratory system travels only down line 12 because of the blocking action at this time of check valve 8, which valve, it would be pointed out, opens only when the pressure on the right-hand side of its crescent-shaped diaphragm 13 exceeds that on the other side. This expelled air travels through check valve 14 and line 15 and enters either rebreathing bellows 16 via line 17 or the bottom of a $CO_2$ canister 18 via line 19, depending upon the status of a two-way air valve 20 that is coupled to the other side of this canister.

Air valve 20, the structure of which will be described in detail hereinafter, has two output sides 21 and 22, one of which is closed when the other is open. Side 21 is coupled to an air blower 69 via line 23. This blower is driven by a motor 24 energized via contacts 25a from voltage source 26, and the output of this blower is coupled via line 27 back to line 7. It will thus be seen that when side 21 of air valve 20 is open a complete rebreathing loop can be traced from the face mask to check valve 14, through the $CO_2$ absorber 18, through air valve 20 to output side 21, blower 69, check valve 8 and line 9, back again to the face mask.

The control element of air valve 20, as best shown in FIG. 2, is a cylindrical piston 28 housed within a sleeve 29 centrally mounted within a housing 30. This housing has an aperture 31 formed in the bottom portion thereof which communicates with line 32, the line leading out of the top of the $CO_2$ cannister 18. It also has a pair of aligned apertures 21 and 22 formed in its opposite end walls. Communicating with the former aperture is line 23, the line that goes to blower 69. Aperture 22 on the other hand, is enclosed by an end cap 33 which has a cenrtal aperture 34 formed therein for slidably accommodating an extension rod 35 which is adapted to displace piston 28 within sleeve 29. This sleeve is perforated by a peripheral series of holes 36 and 37 adjacent each end thereof. These holes are located such that, when piston 28 abuts end wall 38 of housing 30, ports 37 are open to permit any air flowing up line 32 and into housing 30 to pass, via these apertures and similar ports 39 formed in end cap 33, out to the atmosphere. Likewise, when piston 28 abuts the opposite end wall 40, ports 36 are open to permit this air to pass via these ports into line 23, and ports 37 are closed to block the flow previously described. In order to provide a simple but effective air seal for valve 20, each end of piston 28 has an O-ring 41 accommodated therein which cooperates with the confronting portions of the end walls 38 and 40 to effectively close off one or the other of the paths mentioned above, depending upon the particular position of piston 28.

Piston 28 is normally biased by a coil spring 42 to the position shown in FIG. 2, in which position output side 21 is closed and output side 22 opened. The latter side, it will be appreciated, communicates directly with the atmosphere via ports 39 formed in cap 33 and, as will be seen hereinafter, provides part of the discharge path for the individual's expiration when he is breathing in an open circuit mode. In the position shown, piston 28 blocks the recirculating loop mentioned hereinabove and thus disables the rebreathing circuit.

Piston 28 carries at one end thereof, as mentioned above, an extension rod 35 which, as seen in FIG. 1, is under the control of solenoid 43 whose periodic energization is determined in accordance with the schedule established by timer 44. When solenoid 43 is energized, extension rod 35 moves to the right, as seen in FIG. 1, causing piston 28 to move against the restraining action of coil spring 42 to open output side 21 and close output side 22. Hence, the system functions in the rebreathing mode when this solenoid is energized.

It will be appreciated from what has been described hereinbefore that the open and rebreathing modes are established by the setting of air valve 20. In either one of these modes, of course, the individual's breathing action will sooner or later develop the negative pressure at demand valve 5, and this valve will open intermittently to release fresh oxygen into the system. In the open circuit mode, the individual's expirations travel through check valve 14, lines 15 and 19, and the $CO_2$ cannister 18, line 32 and out to the atmosphere via the output side 22 of air valve 20. Hence, in this mode, nitrogen is flushed, not only from the individual's lungs and body, but also from the apparatus. During this portion of the cycle, rebreathing bellows 16 is substantially bypassed, since this component is designed to assume a collapsed position when the system is vented.

When air valve 20 is in its alternate position, that is, when side 21 is open and side 22 closed, the individual's expirations again pass through directional valve 14 but, instead of entering the $CO_2$ absorber 18, they enter rebreathing bellows 16 via line 17. During his inspirational periods, this bellows collapses and the air accumulated therein is drawn upwardly through canister 18 and air valve 20 assisted by the sucking action of blower 69, which sends this processed air via check valve 8 back into the face mask for further use. This mode of operation, of course, corresponds to the rebreathing of a closed circuit condition mentioned hereinbefore.

Blower 69 is included in the air circulating loop to provide the individual with a substantially resistance-free breathing circuit when he is in the rebreathing mode. When in operation, this blower pulls the gas mixture from the expiratory side of the loop and propels it into the inspiratory side. Thus, the gases within this loop are continuously circulated during the rebreathing mode with the individual drawing his inspired breath from a moving air stream and expiring into this stream. This provision removes some of the strain placed on the individual's respiratory system during the rebreathing mode. It would be pointed out at this time that the resistance of the various components in the air circulating loop, together with the size of the various lines, should be chosen such that a neutral pressure occurs in the loop at the point of mask attachment when the blower is in operation. This position of neutral pressure can be thought of as that balance point from which the blower sucks the breathing atmosphere and to which it propels the gases. In selecting the capacity of blower 69, consideration should be given to the fact that, if this blower is too small, a rapidly inspired breath may "starve" the blower and produce a small negative pressure in the system. Likewise, a forced expiration may produce expiratory pressures in the system by exceeding the blower capacity. A blower with a relatively large capacity, on the other hand, will raise the maximum breathing velocity possible without introducing any accompanying pressure increase into the system.

Although a conventional $CO_2$ absorber canister may be used, there are some simple modifications to this device which render it more effective and reduce the needed weight of absorbing material that must be accommodated therein. In the usual $CO_2$ absorber canister, the absorbing material is packed in such a manner that there is generally a channeling of gases through the canister and an ineffective utilization of some of the absorbing material. In order to obtain an even diffusion of the gas through all of the absorbing material, the end covers 45 and 46 of the canister are provided with a plurality of radial ribs, such as 47 and 48, which extend from the central portion thereof outwardly so as to form, in combination with screens 49 and 50 resting thereon, a plurality of air chnanels which direct the gas over the entire end surface of the absorbing material in the lower or input end of the canister and collect the stream of gas on the top or output end of the canister. The central portions 90 of screens 49 and 50 are closed to act as baffles in order to further avoid the channeling effect mentioned above. These baffles confront the inlet and outlet lines 19 and 32 serving canister 18. The above provisions increase the efficiency of the absorber and accordingly decrease the amount of material needed therein. Needless to say, the absorbing canister is designed so that it can be easily opened and a new charge inserted therein whenever necessary.

Timing mechanism 44, as mentioned previously, is included in the system to effect an economic elimination of nitrogen from the individual's respiratory system by allowing him to breathe pure oxygen into his system between pre-established periods of rebreathing. The operation of this timer may best be understood by referring now to FIG. 3 which is an across-the-line diagram of this apparatus. It will be seen from an inspection of this figure that the timing sequence, according to which solenoid 43 is energized and deenergized and the oxygen supply system switched from a closed to an open mode, is established by a series of cams 51, 52, 53, 54 adapted to be rotated either by a relatively low speed timing drive motor 55 or a relatively high speed preset motor 56. These cams, together with the microswitches they control, 57, 58, 59 and 60, selectively energize relays 61 and 62, the present relays; relay 63, the solenoid control relay; and relay 64, the transfer relay. In accordance with conventional practice, the open condition of the contacts controlled by these relays is represented by a pair of spaced vertical lines, while the closed condition is represented by similar lines with an oblique line drawn therethrough. Also, the contacts controlled by each relay bear the same reference character as the relay plus suitable letter references. Thus, for example, relay 64 controls normally open contacts 64a, 64b and normally closed contacts 64c.

The cam positions and switch conditions shown in FIG. 3 correspond to the start of the flight when the individual is placed on a first demand open circuit period. During this period, it will be recalled, the individual is permitted to draw pure oxygen into his respiratory system and discharge his exhalations into the atmosphere for nitrogen flushing purposes. Timing motor 55 at this time is connected across supply line 26 through the normally closed contacts 61a of relay 61. Consequently, cams 51 through 54 start rotating at a rate determined by the speed of this motor. In one preferred embodiment of this invention this motor was designed to rotate the above cams through one complete cycle in approximately one hour. And cams 52 and 53, the two timing cams, which switch the system between the open and the closed modes, had diametrically opposite, raised portions which held their switches 58 and 59 closed for two three-minute and one-minute periods, respectively, during each cycle of rotation.

It will be seen from a study of this circuit that timing cam 52 holds switch 58 closed for a first interval and, during this interval, relay 63 is energized via normally closed contacts 64c. While relay 63 is so energized, contacts 63a remain open, holding solenoid 43 deenergized and permitting coil spring 42 to bias piston 28 of air valve 20 to the position shown in FIG. 2. Thus, the system starts out in the open circuit mode so that the individual's respiratory system can be flushed free of any nitrogen normally present therein.

The system remains in this mode in the preferred modification mentioned previously for a three-minute interval because of the configuration of cam 52. However, when the first raised portion of this cam rotates free of switch 58 and this switch opens, relay 63 becomes deenergized, contacts 63a close, and solenoid 43 now becomes energized. With solenoid 43 now energized, piston 28 moves to the right, as seen in FIG. 2, opening the rebreathing loop and closing the vents to the atmosphere. The individual is now on a rebreathing mode and he remains on this mode for approximately twenty-seven minutes or until the second raised portion of cam 52 again closes switch 58.

When contacts 63a close, not only does solenoid 43 become energized, but relay 25 in series therewith also becomes energized, and this relay, in turn, closes switch 25a in series with blower motor 24. Consequently, when the system switches to the rebreathing mode, blower 69 starts operating to circulate air through the rebreathing loop.

When cam 52 closes switch 58 for the second time in the cycle, contacts 63a return to their open condition, solenoid 43 is again deenergized, and blower 69 deactivated. The system now operates in the open circuit mode and the individual commences to draw fresh oxygen from the storage supply line into his system to flush out any nitrogen accumulated therein and in the apparatus during the aforementioned rebreathing period. The individual continues on the open circuit mode for a second three-minute interval. Toward the end of this interval, that is, as the first cycle of cam rotation nears its completion, cam 54 closes switch 60, thereby connecting relay 64 across the line via normally closed contacts 61b. When relay 64 thus becomes energized, it locks up over contacts 64a which shunt switch 60, and it stays in this locked condition until a preset circuit is activated. Relay 64, which is the transfer relay, now switches the control of solenoid 43 from cam 52 to cam 53 by opening contacts 64c and closing contacts 64b. Cam 53 is similar in design to cam 52. However, its raised portions maintain switch 59 closed for only one-minute intervals of time. Consequently, as timing motor 55 continues to rotate the cams through a second and third cycle, solenoid 43 is deenergized for a one-minute period, then energized for a twenty-nine minute period, then deenergized again for another one-minute period, and then energized for a second twenty-nine minute period, with these periods corresponding to the open and closed modes previously discussed. This cycle continues to be repeated throughout the flight. It would be mentioned that since the individual starts out by being exposed to relatively long periods of nitrogen flushing during the first cycle of rotation cams, the one-minute periods thereafter established are sufficient to take care of the nitrogen thereafter accumulated, since the rate at which this gas evolves diminishes once the individual has been pre-oxygenated.

Since it is important that the first period of breathing be in the open circuit mode at the start of each flight, it is necessary to insure that all of the cams are aligned in the position shown. A manual preset switch 65 is included for this specific purpose. If this switch is closed when all of the cams are in the starting positions shown, it will have no effect on the system because switch 57 will be out of contact with terminal 66 and in contact with terminal 67 because of the action of the raised portion of cam 51. Therefore, preset motor 56 will remain deenergized and the system will continue under the control of timing motor 55. However, if the various cams are not in their starting positions, in other words, if timing motor 54 has rotated them to another position, then the closure of preset switch 65 will cause relay 61 to become energized via normally closed contacts 62a and switch 57, now contacting terminal 66 as a result of this rotation. When relay 61 thus becomes energized, timing motor 55 is taken off the line and preset motor 56 substituted therefor, because of the opening and closing of contacts 61a and 61c, respectively. The energization of relay 61 also places transfer relay 64 in a deenergized status because of the opening of contacts 61b. This last action has the effect of returning the energization of solenoid 43 back to cam 52 when the system next starts out under the control of timing motor 55.

With preset motor 56 now activated, all of the cams commence to rotate at a considerably higher speed, and they continue to so rotate until cam 51 reaches the position shown and brings switch 57 into contact with terminal 67. When this occurs, relay 62 becomes energized. It immediately locks up over contact 62b and opens contacts 62a, thereby deenergizing relay 61 and restoring contacts 61a and 61c to the condition shown in FIG. 3. The system is now in its starting condition, and timing motor 55 again takes over to drive the system through its usual cycle.

As a safety feature, a pressure-responsive switch 68 is included in series with solenoid 43 to transform the system immediately to an open circuit mode in the event of a sudden drop in environmental pressure. If such an emergency occurs, this switch opens automatically, deenergizes solenoid 43 if it is then across the line, and allows coil spring 42 to transfer the system to the open circuit mode. Also, should the power fail at any time during the flight, the system likewise shifts to the open circuit mode again because of the deenergization of solenoid 43 and the action of coil spring 42.

From what has been described hereinbefore, it will be appreciated that the most likely contingencies which might pose a hazard to the aviator have been taken care of by appropriate safeguards. Thus, for example, both loss of cabin pressurizatiton and loss of electric power immediately and automatically places the system in the open circuit mode. Final control of the breathing circuit is, however, left with the individual who can override these automatic controls by means of the manual valve position selector 89 connected to extension rod 35. Thus, for example, should a loss of power occur and the pilot be placed on open circuit breathing, he may at his option use this manual override to shift air valve 20 periodically to the closed circuit mode to conserve his oxygen supply.

In FIG. 4 there is shown a modification of the system disclosed in FIG. 1 which adapts the apparatus to pressure breathing at relatively high altitudes. For this mode of operation, demand valve 70 is modified to include a pressure-responsive device 71 which functions to permit a steady stream of oxygen to flow from inlet line 72, via lines 73, 74, directional valve 75, line 76 and air passageway 77, to the face mask 78 once a predetermined altitude has been surpassed. In order to insure that this flow of oxygen enters the individual's face mask via passageway 77 and does not bypass it by flowing directly into exhaust line 79, a pressure-compensated valve 80 is inserted in this line in place of the simple check valve 14 of FIG. 1. This valve is generally similar in construction to the two-way valve of FIG. 2 in that it has as its control device a piston 81 mounted within a sleeve 82. This piston is biased by a coil spring 83 against a pair of stops 84, in which position it blocks exhaust ports 85 which communicate with the inside of housing 86. A compensating line 87 is connected between line 74 before it enters check valve 75 and sleeve 83 at the backside of piston 81. This connection has the effect of applying equal oxygen pressures on both sides of piston 81 and, consequently, the piston occupies the closed position shown during the inhalation portions of the individual's breathing cycle. Consequently, the oxygen flow cannot bypass passageway 77 during these periods. However, when the individual expires, the increased pressure developed at the left-hand side of piston 81 moves this element to the right against the restraining action of coil spring 83, thereby opening ports 85 and closing the oxygen flow into the valve via line 87. As a result of this, the individual's exhalations can pass out of the system via line 88 which branches off to the $CO_2$ absorber and the rebreathing bellows, as shown in FIG. 1. The use of such a pressure-compensated valving scheme is also shown in applicant's copending application, Serial No. 172, 359, filed February 9, 1962, and entitled "Apparatus for Use in Mouth-to-Mouth Resuscitation." It would be pointed out that the pressure-responsive device 71 associated with demand valve 70 is designed to maintain this valve open only when the plane reaches an altitude slightly above that at which pressure-responsive switch 64 in the timing circuit opens. Consequently, the system first switches to the open circuit mode and then stays in this mode when the conditions necessary for pressure breathing occur.

In connection with the apparatus of FIG. 1 and more particularly the face mask 11, this component, it would be mentioned, can be of extremely simple design since its only purpose is to provide an airtight seal with the face of the aviator. This mask contains no valves and consequently can be much lighter than those of conventional design. If one could be assured that the blower 69 would always operate properly, there would be no need for air directional check valves 8 and 14. However, because one cannot be so assured, the system of FIG. 1 has been so designed that it can also be used when there is a malfunction in blower 69. This is the reason for the inclusion of the above directional valves. When blower 69 is not running, there is some increase in the resistance encountered to the movement of breath in the recirculating loop. However, even with this increase, the overall resistance is lower than that normally encountered in many of the oxygen breathing masks currently in use.

It would be pointed out that the incorporation of the pressure reducing valve 3 in the oxygen delivery line permits a simple and lightweight demand valve to be used in the system, for without this reducer the demand valve would have to withstand the high pressures at which the oxygen is stored. To withstand this pressure, of course, its weight and bulk would have to be increased.

It would be pointed out also in connection with the system of FIG. 1 that all of the components can be seat-mounted so that the apparatus can serve as a prime oxygen source and as an oxygen storage supply for use during ejection and high altitude descent for those aircraft which have ejecttion seats.

As mentioned in applicant's copending application, Serial No. 166,005, filed January 11, 1962, for A Compact Walk-Around Rebreathing Device, there are several advantages in utilizing thin wall structures for the oxygen storage reservoir 1. First, this construction reduces the weight of the container. Secondly, a container fabricated from thin walled elements may be molded to the configuration of the available space in the aircraft. Thirdly, disruption of such a container by impact, for example, will produce only a tearing fracture with rapid release of the impounded oxygen and not the shrapnel-like fracture likely to occur with conventional oxygen storage cylinders.

In one practical embodiment of the system, an accordion pleated, rubber rebreathing bellows was used. Such a design has several advantages. In this respect, it can be molded such that its relaxed position is in the collapsed state to maintain a minimum bellows volume during open circuit breathing. Another advantage is that the bellows can be made only large enough to accommodate a tidal breath commensurate with the workload of the wearer. If a deep breath is taken during inspiration which will not only empty the bellows but also admit additional oxygen through the demand valve, the subsequent expiration will first fill the bellows to its extended capacity and then cause it to blow up like a balloon. Not only will this accommodate an occasional tidal breath but the increased breathing resistance encountered will also warn the breather of possible impending hyperventilation.

As indicated in applicant's copending application, Serial No. 166,005, canister 13 can be charged with a chemical which reacts with the individual's exhalations to absorb carbon dioxide and liberate free oxygen into the system. The use of such a chemical, of course, would reduce the amount of oxygen stored under pressure in container 1. In such an arrangement, the two-way air valve 20 would be relocated before the inlet side of canister 18 somewhere in line 19. By positioning the two-way air valve on the other side of the air canister, the oxygen generated by the above chemical would not leak out of the system during the open circuit mode of operation.

Obviously many modifications and variations of the present invention are possible in the light of the above teachings. It is therefore to be understood that within the scope of the appended claims the invention may be practiced otherwise than as specifically described.

What is claimed is:

1. In combination, a source of oxygen, a face mask having an air passageway formed therein, means for admitting oxygen from said source into said air passageway at a rate related to the respiratory demands of an individual wearing said face mask, a recirculating closed loop connected to said air passageway, means positioned within said closed loop for permitting only a unidirectional flow of gas within said loop whereby whenever said individual's experiations are discharged into said air passageway and enter said closed loop they flow therearound in one direction, a carbon dioxide absorbing canister disposed within said recirculating loop, an electrically operated valve coupled to said recirculating loop, said valve when deenergized preventing the circulation of air through said loop and opening one side of said loop to the atmosphere and when energized permitting the circulation of air through said loop and closing said one side to the atmosphere, and means for controlling the energization of said electrically operated valve such that said valve remains deenergized for a first series of predetermined time intervals which are long compared to the time between successive inspirations of said individual and energized for a second series of predetermined time intervals which are long compared to the time between successive expirations of said individual whereby nitrogen accumulated within the respiratory system of said individual is periodically flushed therefrom during said first series of predetermined time intervals.

2. In an oxygen supply system for use by individuals exposed to atmospheres the oxygen content of which is inadequate to sustain their respiratory action, the combination of a source of oxygen, a face mask having an air passageway formed therein, an input and output tube connected to said air passageway, a recirculating loop interconnecting said input and output tubes, means positioned within said closed loop for permitting only a unidirectional flow of gas within said loop whereby whenever said individual's expirations are discharged into said air passageway and enter said closed loop they flow therearound in one direction, a carbon dioxide absorbing substance positioned within said loop, an electrically operated valve connected within said loop between said input tube and said $CO_2$ absorbing substance, said valve in a first position blocking said loop and opening a venting path to the atmosphere for one side of said loop and in a second position opening said loop and closing said venting path to the atmosphere, means for controlling the energization of said electrically operated valve such that said valve is initially in said first position for a first period of time during which said individual inhales pure oxygen with his exhalations being discharged into the atmosphere for nitrogen flushing periods and thereafter in said second position for a longer period of time to minimize the amount of oxygen drawn from said source, said first period of time being long compared to the time between successive inhalations of said individual whereby said individual inhales pure oxygen during a multiplicity of breathing cycles.

3. In an arrangement as defined in claim 2, an air circulator connected in said loop between said $CO_2$ absorbing substance and said input tube, means for rendering said circulator operative when said valve is in said second position and a rebreathing container coupled to said loop between said output tube and said $CO_2$ absorbing substance.

4. An oxygen supply system for use by an individual exposed to an atmosphere the oxygen content of which is insufficient to sustain his respiratory system comprising, in combination, a source of oxygen, a face mask having an air passageway formed therein, a demand valve positioned between said source and said air passageway for admitting oxygen periodically into said air passageway from said source initially at a rate depending upon the respiratory requirements of an individual wearing said face mask, a recirculating closed loop connected to said air passageway, means positioned within said closed loop for permitting only a unidirectional flow of gas within said loop whereby whenever said individual's expirations are discharged into said air passageway and enter said closed loop they flow therearound in one direction, an air purifying substance included within said recirculating loop, means coupled to said recirculating closed loop and operative in a first position for discharging said individual's exhalations which are expelled into said air passageway into the atmosphere and in a second position for permitting said exhalations to travel around said recirculating loop for subsequent use by said individual, means operative when the environmental pressure decreases to a predetermined level for maintaining said last-mentioned means in said first position, and means operative when said environmental pressure is less than said predetermined level for maintaining said demand valve open to permit a continuous flow of oxygen to take place from said source into said air passageway whereby said individual is placed in a pressure breathing mode.

5. In an arrangement as defined in claim 4, valve means positioned within said recirculating loop for preventing oxygen from flowing around said loop when said demand valve is maintained open, said valve opening only during the exhalation portion of the breathing cycle of said individual.

6. In an arrangement as defined in claim 4 wherein said air purifying substance comprises a chemical which absorbs carbon dioxide and in doing so liberates fresh oxygen into the recirculating loop to augment that available from said source of oxygen.

7. In an oxygen supply system for use in rarefied atmospheres, the combination of a facemask, said facemask having an external air supply line which communicates with the interior area of the mask and is opened at a remote end thereof, an air recirculating closed loop connected to the remote end of said air supply line, valve means positioned within said closed loop for permitting only a unidirectional flow of gas around said loop whereby, whenever an individual wearing said facemask exhales, his expirations are discharged into said air supply line, enter said air recirculating closed loop and flow therearound in one direction only, a source of compressed oxygen, means including a pressure reducer and a demand valve connected between said source of compressed oxygen and said air recirculating closed loop for feeding fresh oxygen into said loop and into said air supply line in accordance with the respiratory requirements of the individual wearing said facemask, air purifying means positioned within said air recirculating closed loop for absorbing carbon dioxide, a valve connected to said loop, said valve in a first position blocking the circulation of air within said loop and opening a venting path to the atmosphere to one side of said loop, said valve in a second position permitting the circulation of air through said loop and closing said venting path, and automatic means for switching said valve back and forth between said first and second positions in accordance with a pre-established schedule such that during corresponding first intervals of time said individual can inhale pure oxygen on demand from said oxygen supply source and discharge his exhalations into the atmosphere and during second intervals of time rebreathe his exhalations after the carbon dioxide content thereof has been reduced by the action of said air purifying means, said first intervals of time and said second intervals of time both being long compared to the time between successive inspirations or expirations of said individual.

8. In an arrangement as defined in claim 7, a blower positioned within said loop and means for activating said blower when said valve is in said second position.

9. In an arrangement as defined in claim 7, a rebreathing container coupled to said loop, said rebreathing container being adapted to assume a collapsed position when said valve is in said first position.

10. In an arrangement as defined in claim 7, means responsive to the sudden drop in environmental pressure for automatically switching said valve to said first position.

11. In an arrangement as defined in claim 7 wherein said air valve is electrically operated and means responsive to an electrical power failure for automatically switching said valve to said first position.

References Cited by the Examiner
UNITED STATES PATENTS

| | | | |
|---|---|---|---|
| 2,220,673 | 11/40 | Bloomheart | 137—63 |
| 3,019,804 | 2/62 | Miller | 137—64 |
| 3,044,464 | 7/62 | Gray | 128—142 |

FOREIGN PATENTS

| | | |
|---|---|---|
| 693,131 | 6/53 | Great Britain. |

RICHARD A. GAUDET, *Primary Examiner.*
JORDAN FRANKLIN, *Examiner.*